(12) United States Patent
Heitmann et al.

(10) Patent No.: US 12,384,269 B2
(45) Date of Patent: Aug. 12, 2025

(54) MULTI-FUNCTION RACK SYSTEMS AND METHODS

(71) Applicant: The Raymond Corporation, Greene, NY (US)

(72) Inventors: Erric L. Heitmann, Jamesville, NY (US); Craig Fahrenkrug, Vestal, NY (US)

(73) Assignee: The Raymond Corporation, Greene, NY (US)

( * ) Notice: Subject to any disclaimer, the term of this patent is extended or adjusted under 35 U.S.C. 154(b) by 336 days.

(21) Appl. No.: 18/099,626

(22) Filed: Jan. 20, 2023

(65) Prior Publication Data

US 2023/0226940 A1    Jul. 20, 2023

Related U.S. Application Data (60) Provisional application No. 63/301,228, filed on Jan. 20, 2022.

(51) Int. Cl.
*H02J 50/90* (2016.01)
*B60L 53/126* (2019.01)
(Continued)

(52) U.S. Cl.
CPC ............. *B60L 53/65* (2019.02); *B60L 53/126* (2019.02); *B66F 9/07504* (2013.01);
(Continued)

(58) Field of Classification Search
CPC .... B60L 53/65; B60L 53/126; B60L 2200/42; B60L 2240/24; B60L 2240/421;
(Continued)

(56) References Cited

U.S. PATENT DOCUMENTS

| 6,535,790 B2 | 3/2003 | Nakano et al. |
|---|---|---|
| 8,545,284 B2 | 10/2013 | Baarman et al. |

(Continued)

FOREIGN PATENT DOCUMENTS

| CN | 109835210 A | * | 6/2019 | ........... G01R 31/387 |
|---|---|---|---|---|
| EP | 2632762 B1 | | 5/2017 | |

(Continued)

OTHER PUBLICATIONS

European Patent Office, Extended Search Report, Application No. 23152735.9, Jun. 22, 2023, 8 pages.

*Primary Examiner* — Justin Holmes
(74) *Attorney, Agent, or Firm* — Quarles & Brady LLP (57) ABSTRACT

A location determination system for a material handling vehicle operating near a charging node. The system may include a power receptor configured to receive power from the charging node and provide current to the material handling vehicle. The system may include a sensor electrically coupled to the power receptor and configured to measure the current provided by the power receptor, and a controller configured to determine a current profile based on the measured current and determine a distance of the power receptor to the charging node based on the current profile. The system may determine the distance of the material handling vehicle from the charging node and may determine the location of the material handling vehicle based on a predetermined location of the charging node. The system may comprise multiple power receptors each with a current profile and may determine a speed and/or direction based on the multiple current profiles.

20 Claims, 4 Drawing Sheets

(51) Int. Cl.
    *B60L 53/65*   (2019.01)
    *B66F 9/075*   (2006.01)
(52) U.S. Cl.
    CPC ......... *B66F 9/0755* (2013.01); *B60L 2200/42* (2013.01); *B60L 2240/24* (2013.01); *B60L 2240/421* (2013.01); *B60L 2240/549* (2013.01)
(58) Field of Classification Search
    CPC .... B60L 2240/549; B60L 53/66; B60L 53/38; B60L 2200/44; B66F 9/07504; B66F 9/0755; Y02T 10/70; Y02T 90/12; Y02T 10/7072; H02J 50/90; H02J 50/05; H02J 50/10; G01B 7/003
    See application file for complete search history.

(56) References Cited

U.S. PATENT DOCUMENTS

| | | | |
|---|---|---|---|
| 9,397,518 | B1 | 7/2016 | Theobald |
| 9,505,314 | B2 | 11/2016 | Widmer |
| 9,663,296 | B1 | 5/2017 | Dingle et al. |
| 9,758,049 | B2 | 9/2017 | Sullivan et al. |
| 9,758,305 | B2 | 9/2017 | Johnson et al. |
| 10,797,537 | B2 | 10/2020 | Chowdhury et al. |
| 11,245,289 | B2 | 2/2022 | Johnston et al. |
| 2017/0015502 | A1 | 1/2017 | Engel et al. |
| 2017/0107055 | A1 | 4/2017 | Magens et al. |
| 2017/0136881 | A1 | 5/2017 | Ricci |
| 2017/0158430 | A1 | 6/2017 | Raizer |
| 2022/0190648 | A1 | 6/2022 | Ahn et al. |

FOREIGN PATENT DOCUMENTS

| | | | | |
|---|---|---|---|---|
| EP | 3243771 B1 | | 11/2018 | |
| EP | 3140149 B1 | | 8/2020 | |
| JP | 2022008124 A | * | 1/2022 | .............. B60L 53/60 |
| WO | WO-2015195442 A1 | * | 12/2015 | .............. B60L 53/12 |
| WO | 2021155345 A1 | | 8/2021 | |

* cited by examiner

MULTI-FUNCTION RACK SYSTEMS AND METHODS

CROSS-REFERENCES TO RELATED APPLICATIONS

This application is based on, claims priority to, and incorporates herein by reference in its entirety U.S. Provisional Patent Application No. 63/301,228 filed Jan. 20, 2022, and entitled "MULTI-FUNCTION RACK SYSTEMS AND METHODS."

BACKGROUND

Battery powered material handling vehicles require periodic recharging of their batteries. Recharging generally requires either removing a depleted battery from a material handling vehicle, installing a charged battery into the material handling vehicle, and recharging the depleted battery, or parking the material handling vehicle and recharging the depleted battery. In both cases, warehouse assets (e.g., batteries and/or material handling vehicles) are unable to be used for regular periods of time, as it may take hours to recharge batteries. Excessive downtime caused by recharging batteries can negatively affect the productivity and/or profitability of the material handling vehicle and the warehouse the material handling vehicle operates in. Furthermore, substantially and/or fully depleting batteries (e.g., 80% to 100% depth of discharge) can prematurely shorten the lifespan of batteries.

Additionally, there are several difficulties in tracking and/or remotely piloting material handling vehicles in a warehouse. Certain tracking approaches that use wire-guided material handling vehicles require technicians to install guidance wires on paths where a material handling vehicle is piloted. Similarly, approaches that use markers such as optical markers and/or RFID tags require the markers to be installed on paths where the material handling vehicle travels.

In addition, for certain types of vehicles there are training requirements imposed by various government agencies, laws, rules and regulations. For example, OSHA imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

BRIEF SUMMARY

The present disclosure relates generally to multi-function rack systems and methods for use with material handling vehicles. For example, a multi-function rack can be used with material handling vehicles such as forklifts in warehouses and/or other storage facilities. The term "multi-function rack" may refer to a rack arrangement that provides at least one functional aspect in addition to providing storage capabilities (e.g., supporting loads). For example, a multi-function rack may provide storage capabilities as well as provide location tracking and/or power delivery for material handling vehicles.

According to some aspects of the present disclosure, a location determination system for a material handling vehicle operating near a charging node is provided. The system can include a power receptor configured to receive electric power from the charging node and provide a current to the material handling vehicle, wherein the current is based on the received electric power, a sensor electrically coupled to the power receptor and configured to measure the current provided by the power receptor, and a controller communicatively coupled to the sensor and configured to determine a current profile based on the measured current and determine a distance of the power receptor to the charging node based on the current profile.

According to some aspects of the present disclosure, a power delivery system for receiving power from a charging node is provided. The system can include a material handling vehicle, comprising a power receptor coupled to the material handling vehicle and configured to receive electric power wirelessly from the charging node and provide a current to the material handling vehicle, wherein the current is based on the received electric power, a sensor electrically coupled to the power receptor and configured to measure the current provided by the power receptor, and a controller electrically coupled to the sensor and configured to determine a current profile based on the measured current, wherein the current profile comprises time-varying current measurements, and determine a location of the material handling vehicle based on the current profile.

According to some aspects of the present disclosure, a method for determining a location of a material handling vehicle is provided. The method can include receiving, via a wireless power receptor, electric power from a charging node, providing, via the wireless power receptor, a current to the material handling vehicle based on the received electric power, measuring the current provided by the wireless power receptor at a plurality of times, determining a current profile based on the plurality of measured currents, and determining a distance of the power receptor to the charging node based on the current profile.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

Corresponding reference characters indicate corresponding parts throughout several views. Although the drawings represent embodiments of the present disclosure, the drawings are not necessarily to scale and certain features may be exaggerated in order to better illustrate and explain the embodiments of the present disclosure.

DETAILED DESCRIPTION

Before any aspects of the present disclosure are explained in detail, it is to be understood that the present disclosure is not limited in its application to the details of construction and the arrangement of components set forth in the following description or illustrated in the following drawings. The present disclosure is capable of other non-limiting examples and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Likewise, "at least one of A, B, and C," and the like, is meant to indicate A, or B, or C, or any combination of A, B, and/or C. Unless specified or limited otherwise, the terms "mounted," "secured," "connected," "supported," and "coupled" and variations thereof are used broadly and encompass both direct and indirect mountings, connections, supports, and couplings. Further, "connected" and "coupled" are not restricted to physical or mechanical connections or couplings.

It is also to be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

It should be appreciated that material handling vehicles are designed in a variety of classes and configurations to perform a variety of tasks. It will be apparent to those of skill in the art that the present disclosure is not limited to any specific material handling vehicle, and can also be provided with various other types of material handling vehicle classes and configurations, including for example, lift trucks, forklift trucks, reach trucks, SWING REACH® vehicles, turret trucks, side loader trucks, counterbalanced lift trucks, pallet stacker trucks, order pickers, transtackers, tow tractors, and man-up trucks, and can be commonly found in warehouses, factories, shipping yards, and, generally, wherever pallets, large packages, and/or loads of goods can be required to be transported from place to place. The various systems and methods disclosed herein are suitable for any of operator controlled, pedestrian controlled, remotely controlled, and autonomously controlled material handling vehicles. Further, the present disclosure is not limited to material handling vehicles applications. Rather, the present disclosure may be provided for other types of vehicles, such as automobiles, buses, trains, tractor-trailers, farm vehicles, factory vehicles, and the like.

Generally, the present disclosure provides systems and methods for power delivery and location determination, for example using a multi-function rack, that in some embodiments is configured to supplement material handling vehicles with energy, for example providing electrical energy to charge a battery or power a motor of the material handling vehicle. In some embodiments, the multi-function rack may provide a portion of the power required by the material handling vehicle, and the remaining power may be supplied by a battery onboard the material handling vehicle. While such systems are discussed primarily with respect to material handling vehicles and storage racking, it should be appreciated that the various aspects of the disclosure can be applied to other vehicles and environments as well.

Figure 1:
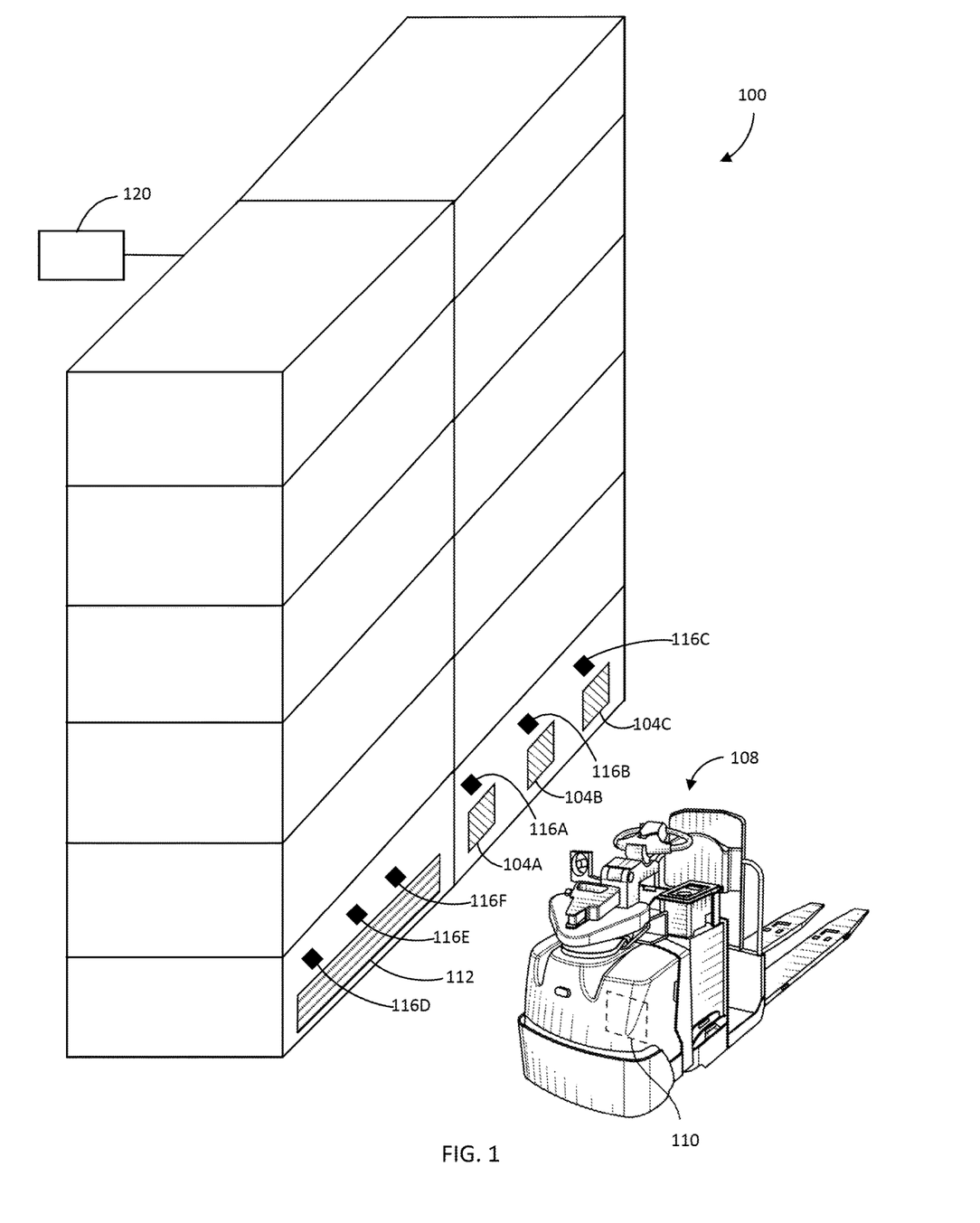
FIG. 1 illustrates a multi-function rack, in accordance with an embodiment.

FIG. 1 shows an exemplary multi-function rack system 100. The multi-function rack system 100 may be used, for example, in a warehouse. The multi-function rack system 100 may comprise a storage rack 102. In some embodiments, the rack system 100 can include one or more charging nodes 104. For example, the rack system 100 can include a first charging node 104A, a second charging node 104B, and a third charging node 104C. The charging nodes 104A-C can be positioned at a predetermined height above a base of the storage rack 102. The predetermined height can be selected based on the rack 102 and/or type of a material handling vehicle 108 in the warehouse. For example, the predetermined height may be determined based on the height (e.g., above a ground surface) of a power receiver on the material handling vehicle 108. In some embodiments, the charging nodes 104A-C can be coupled to the first level or higher of the storage rack 102, which may allow the material handling vehicle 108 to charge without affecting with the lowest rack level.

The charging nodes 104A-C can be spaced apart at regular intervals along the rack system 100. In some embodiments, the distance between the charging nodes 104A-C can be determined based on the power requirements of material handling vehicles. For example, in applications with relatively higher power requirements, the charging nodes 104A-C can be placed closer together (e.g., one foot apart) than in applications with relatively lower power requirements (e.g., three feet apart). Closer spacing of charging nodes 104A-C and/or an otherwise increased number of charging nodes 104 can provide more frequent opportunities for the material handling vehicle 108 to receive power as it moves along the multi-function rack system 100. In some embodiments, a charging node may comprise a continuous charging pad 112. The continuous charging pad 112 can be any length, up to (for example) the full length of the storage rack. In some exemplary embodiments, the continuous charging pad 112 may extend along the majority and/or entire length of a section of the rack system 100. For example, the continuous charging pad 112 can be approximately twelve feet long for a storage rack 102 having twelve foot wide sections.

The charging nodes 104, 112 may comprise any suitable system and/or method for providing electric power. The charging nodes 104, 112 can transmit electric power to the material handling vehicle 108 in order to power the material handling vehicle 108 (e.g., a motor), and/or to charge a battery 110 included in the material handling vehicle 108. In some embodiments, the charging nodes 104, 112 can be wireless power transmitters, for example inductive (e.g., coil-based) or capacitive wireless power transmitters. In some embodiments, the charging nodes 104A-C, 112 can be a contact-based power transmitter. For example, the charging nodes 104, 112 can include an electrically conductive surface that supplies a current to a contactor arm (e.g., arms 114 referring briefly to FIG. 2) electrically coupled to the material handling vehicle 108. The contactor arm 114 can include an arm that extends from the material handling vehicle 108 to the electrically conductive surface, and a distal end of the arm may include a conductive surface configured to contact the electrically conductive surface and receive the current from the charging node 104A-C, 112.

In some embodiments, the rack system 100 can include a number of sensors that can detect the presence and/or location of the material handling vehicle 108. In some embodiments, the rack system 100 can include a first sensor 116A, a second sensor 116B, a third sensor 116C, a fourth sensor 116D, a fifth sensor 116E, and/or a sixth sensor 116F. In some embodiments, the sensors 116 can include at least one proximity sensor (e.g., an inductive sensor, an optical sensor, etc.) that can detect the presence of the material handling vehicle 108 in an aisle near any of the sensors 116A-F. In some embodiments, the first sensor 116A, the second sensor 116B, and the third sensor 116C can be positioned above a corresponding charging nodes 104A-C. For example, the first sensor 116A can be positioned above the first charging node 104A, the second sensor 116B can be positioned above the second charging node 104B, and/or the third sensor 116C can be positioned above the third charging node 104C.

The multifunction rack system 100 may be configured to communicate with a warehouse management system 120. For example, the warehouse management system 120 may communicate with (e.g., wired or wirelessly) or otherwise control the charging nodes 104A-C, continuous charging pad 112, sensors 116A-F, or the like. The warehouse management system 120 may perform functions such as routing of material handling vehicles, charging control, vehicle location determination, zone monitoring, and the like. In some embodiments, a warehouse management system 120 can turn the charging nodes 104A-C and/or the continuous charging pad 112 on and off based on information from the sensors 116A-F (e.g., information indicating presence of the material handling vehicle 108). In some embodiments, the warehouse management system 120 can turn on the respective charging node 104A-C and/or the continuous charging pad 112 closest to the sensor(s) 116A-F that detected the material handling vehicle 108. In some embodiments, the warehouse management system 120 can turn on all charging nodes 104A-C and/or the continuous charging pad 112 if any of the sensor(s) 116A-F detect the material handling vehicle 108. In some embodiments, the charging nodes 104A-C and/or the continuous charging pad 112 can be left on continuously and the sensors 116A-F may not be required. In some embodiments, the warehouse management system 120 may use information on demand to adjust the voltage, current, and/or add or remove capacity onto the network of charging nodes 104, for example to monitor and limit current draw to avoid exceeding power delivery capacity or other predetermined limits.

Figure 2:
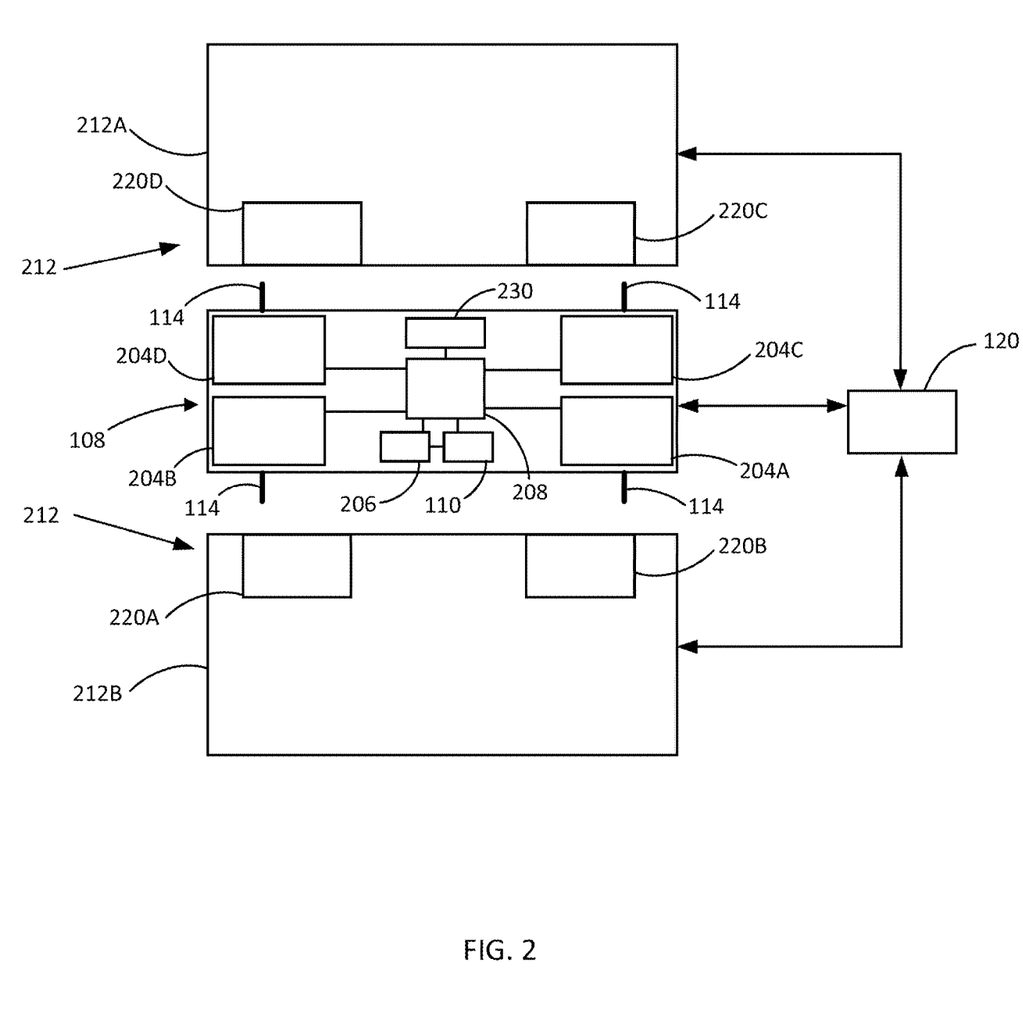
FIG. 2 schematically represents a material handling vehicle and a multi-function rack, in accordance with an embodiment.

Referring now to FIG. 2, a top-down view of the material handling vehicle 108 and an exemplary multi-function rack system 212 is shown. In some embodiments, the material handling vehicle 108 and/or the multi-function rack system 212 may be configured to communicate with the warehouse management system 120. For example, the controller 208 of the material handling vehicle may communicate with the warehouse management system 120.

The material handling vehicle 108 can include one or more power receptors 204 and a battery 110. In some embodiments, the material handling vehicle 108 can include a first power receptor 204A, a second power receptor 204B, a third power receptor 204C, and/or a fourth power receptor 204D. In some embodiments, the power receptors 204A-D can be positioned at a front right corner of the material handling vehicle 108, a rear right corner of the material handling vehicle 108, a front left corner of the material handling vehicle 108, and a rear left corner of the material handling vehicle 108, respectively. In some embodiments, the material handling vehicle 108 may include a single power receptor 204 on each side of the material handling vehicle 108. In some such embodiments, each power receptor 204 can extend along the majority and/or the entirety of each side of the material handling vehicle 108.

The power receptors 204 may comprise any suitable system and/or method for receiving electric power. The power receptors may be configured to receive electric power and to provide the electric power for use by the material handling vehicle 108. In some embodiments, the received electric power may be used to charge a battery 110, and/or power a motor 230 or other functions of the material handling vehicle. In some embodiments, the power receptors 204A-D can be wireless power receivers, for example inductive (e.g., coils) or capacitive wireless power receivers that can receive wireless power from the multi-function rack 212. In some embodiments, each of the power receptors 204A-D can include a contactor arm 114 that extends from the material handling vehicle 108 and is configured to electrically couple with (e.g., via contacting) a conductive surface included on the multi-function rack 212, for example one of the charging nodes 104A-C and/or the continuous charging pad 112. A distal end of each contactor arm 114 may include a conductive surface that receives the current from the electrically conductive surface of the charging node 220 included in the multi-function rack 212.

The number and location of the charging nodes 220 and power receptors 204 may be chosen based on the configuration and amperage requirements of the material handling vehicle(s) 108 that operate near the multi-function rack 212. For example, a smaller material handling vehicle 108 may require less power transfer, and so fewer charging nodes 220 and/or fewer power receptors 204 may be required. A smaller material handling vehicle 108 may include a power receptor 204 at each corner of the material handling vehicle 108. For further example, a larger or higher current material handling vehicle 108 may include a power receptor 204 strip along substantially all of one or more sides of the material handling vehicle 108.

Figure 5:
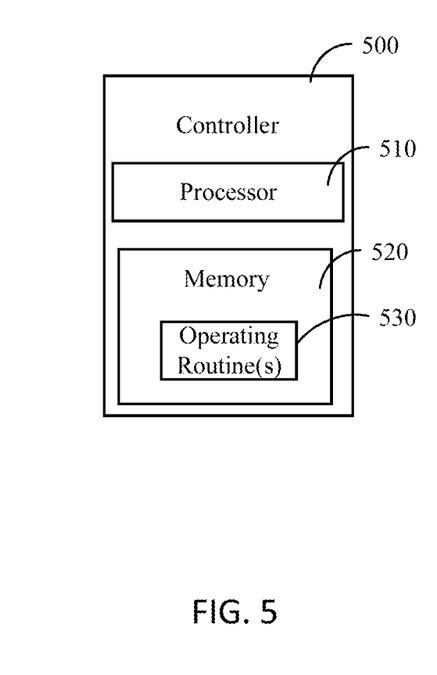
FIG. 5 illustrates an example controller, in accordance with an embodiment.

Referring briefly to FIG. 5, various components of the material handling vehicle 108, the multi-function rack 212, and/or the warehouse management system 120 may be implemented on one or more controllers 500. Referring back to FIG. 2, in some embodiments, the material handling vehicle 108 can include a controller 208 communicatively coupled to the one or more power receptors 204A-D, the battery 110, a motor 230 (e.g., a traction motor for moving the vehicle) and/or an electrical sensor 206 (e.g., a current sensor). Communicative coupling may comprise electrical coupling. In some embodiments, the electrical sensor 206 may be communicatively coupled with a controller other than the controller 208 of the material handling vehicle 108, for example a controller of the multi-function rack 212 and/or the warehouse management system 120, described below.

The electrical sensor 206 may be coupled with one or more power receptors 204A-D (such coupling not shown in FIG. 2). Each power receptor may have its own electrical sensor 206. As will be described in greater detail below, the electrical sensor 206 and the controller 208 can work together to determine a distance of the material handling vehicle 108 from the multi-function rack 212 and/or the location of the material handling vehicle 108 within the operating environment of the multi-function rack system 212 (e.g., location within a warehouse). In some embodiments, the controller 208 may include a battery management unit to control and monitor charging of the battery 110, state of charge, perform battery protection functions, and the like.

Referring again to FIG. 5, a controller 500, such as controller 208, may be configured to send and/or receive information (e.g., including instructions, data, values, signals, or the like) to/from the various components of the material handling vehicle 108, the multi-function rack 212, and/or the warehouse management system 120. The controller 500 may comprise processing circuitry 510, for example, a processor, DSP, CPU, APU, GPU, microcontroller, application-specific integrated circuit, programmable gate array, and the like, any other digital and/or analog components, as well as combinations of the foregoing (whether distributed, networked, locally connected, or the like), and may further comprise inputs and outputs for receiving and providing control instructions, control signals, drive signals, power signals, sensor signals (e.g., current or voltage sensor output), digital signals, analog signals, and the like. All such computing devices and environments are intended to fall within the meaning of the term "controller," "control unit," "processor," "processing device," or "processing circuitry" as used herein unless a different meaning is explicitly provided or otherwise clear from the context. In some examples, the controller 500 may comprise one or more such processor devices.

The controller 500 may comprise processing circuitry 510 configured to execute operating routine(s) 530 stored in a memory 520. The controller 500 may directly include the memory 520 (e.g., local memory) or may be otherwise communicatively coupled to the memory 520 (e.g., a remote server). The memory 520 may include any suitable volatile memory, non-volatile memory, storage, any other suitable type of storage medium, or any suitable combination thereof. For example, the memory 520 may include RAM, ROM, EEPROM, one or more flash drives, one or more hard disks, one or more solid state drives, one or more optical drives, etc. In some embodiments, the memory 520 may have encoded thereon a computer program (e.g., operating routine) for controlling operation of the controller 500, material handling vehicle 108, the multi-function rack 212, the warehouse management system 120, and the like. In some embodiments, the various components of the material handling vehicle 108, the multi-function rack 212, and/or the warehouse management system 120 may be implemented entirely as software (e.g., operating routine), entirely as hardware, or any suitable combination thereof. In some embodiments, the operating routine(s) 530 may comprise firmware.

Referring again to FIG. 2, in some embodiments, the multi-function rack 212 can include a first section (or side) 212A and a second section (or side) 212B, for example a left side and a right side of an aisle through which the material handling vehicle 108 can travel. In some embodiments, the multi-function rack 212 can include the rack system 100 in FIG. 1. The multi-function rack 212 can include a number of charging nodes 220A-D, which may be the same or substantially similar to the charging nodes 104A-C and/or 112 in FIG. 1. As will be described below, the charging nodes 220A-D can be used to identify the position of the material handling vehicle 108.

In some embodiments, the charging nodes 220A-D can be spaced at a sufficiently short distance to provide constant power to the material handling vehicle 108. In some embodiments, the charging nodes 220A-D can be spaced apart by approximately a foot, by approximately a meter, by approximately two meters, or the like. If the charging nodes 220A-D are spaced together closely, there may always be at least one power receptor 204A-D receiving power from at least one of the charging nodes 220A-D. In some embodiments where the material handling vehicle 108 includes a single (e.g., long or strip-like) power receptor 204 on each side of the material handling vehicle, the power receptors 204 may each interface with multiple charging nodes 220A-D simultaneously. The controller 208, for example via the battery management unit, can monitor and control the current applied to the material handling vehicle 108 (e.g., motor 230) and/or battery 110 from the multiple charging nodes 220A-D.

In some embodiments, the charging nodes 220A-D can communicatively couple with the power receptors 204A-D. The communicative coupling may be one way (in either direction) or two way. In some embodiments, the charging nodes 220A-D may communicate with the power receptors 204A-D using a communication protocol, for example a power line communication (PLC) type protocol, communication over wireless power transfer, and the like. For example, a modulated carrier frequency can be added to the current, voltage, or electromagnetic signals transmitted by one or more of the charging nodes 220A-D to transmit instructions to one or more of the power receptors 204A-D. In some embodiments, one or more charging nodes 220A-D and/or one or more power receptors 204A-D may include wireless transmitters and/or receivers, for example configured to send and/or receive wireless data. In some embodiments, the material handling vehicle 108 may be configured to communicate, for example by a separate transceiver or by the power receptors 204A-D, using the same wireless communication standard(s) as the charging nodes 220A-D. In some embodiments, the charging nodes 220A-D may implement millimeter wave (e.g., 60 GHz) wireless transmission, and one or more charging nodes 220A-D may act as anchor points. For example, the charging node 220, with a known location, may be used as the anchor and range may be determined based on time of flight. In this way, instructions (e.g., movement commands), location information (e.g., determined by the material handling vehicle 108), and the like can be transmitted via the multi-function rack 212 using the communication protocol.

Figure 3A:
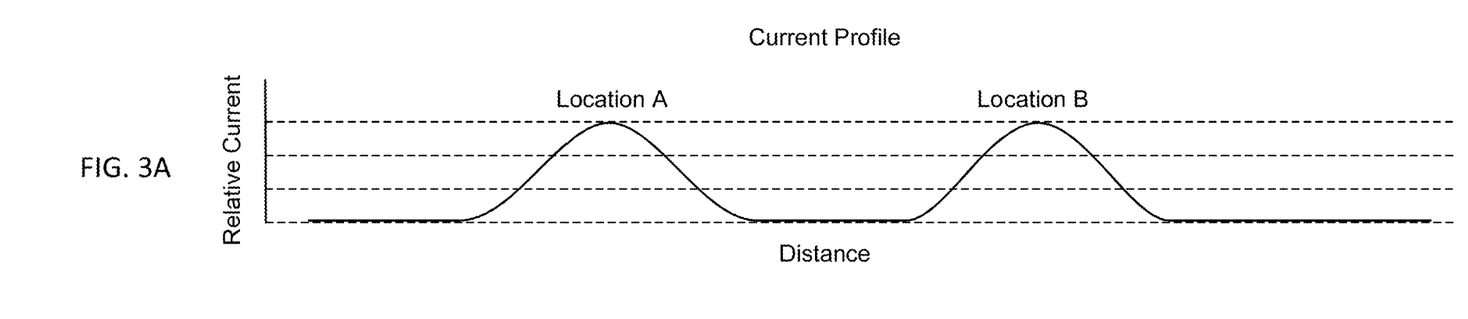
FIG. 3A graphically represents a first distance-varying current, in accordance with an embodiment.

Referring now to FIG. 2, as well as FIG. 3A, an exemplary graph of a distance-varying current at a power receptor (e.g., one of power receptors 204A-D) is shown. More specifically, the power receptor 204A-D can be a wireless power receptor (e.g., an inductive charging coil). The current at the power receptor 204A-D can be the current flowing in inductive charging coils of the respective power receptor 204A-D, induced by an inductive charging coil of a charging node (e.g., one of charging nodes 220A-D). In other words, when the charging coils of the power receptor 204 and charging node 220 are sufficiently close, they may inductively couple and thereby allow a current to be generated in the coil of the power receptor 204. An inductive coupling amount may vary based on the distance between the power receptor 204 and the charging node 220, for example increasing or decreasing as the material handling vehicle 108 moves closer or further away from the charging node 220 in any direction along the two-dimensional plane parallel to the ground surface on which the material handling vehicle 108 operates (e.g., movement along a path parallel to or perpendicular to the direction of the multi-function rack 212).

The current at the one or more power receptors 204A-D can be measured, for example by a current sensor 206 communicatively coupled to the controller 208 and/or power receptors 204A-D. Based on the measured current, the location of the material handling vehicle along the length of, as well as the lateral distance to, the multi-function rack 212 can be estimated, as will be described below. In some embodiments, the current may be measured at the one or more charging nodes 220A-D, for example by a coupled current sensor.

The current of the power receptor 204 (which may be referred to herein as the "coupled current") may vary based on the proximity of the power receptor 204A-D to various charging nodes 220A-D. For example, the coupled current may peak and/or plateau at a location A corresponding to a first charging node 220 (e.g., the first charging node 220A) and a location B corresponding to a second charging node 220 (e.g., the second charging node 220B). As the material handling vehicle moves past the first charging node (e.g., on a path parallel to the length of the multi-function rack 212), the power receptor 204 (e.g., the first power receptor 204A), may receive power from the first charging node, and the coupled current may increase, peak, and then decrease. The coupled current may increase as the material handling vehicle 108 continues past the second charging node and the power receptor 204 (e.g., the first power receptor 204A) receives power from the second charging node.

Additionally, the current may also vary as the material handling vehicle 108 moves laterally closer to or further away from the charging nodes 220A-D. In some embodiments, the lateral distance between the material handling vehicle and the multi-function rack 212 can be estimated based on the measured amperage at a peak in the measured current (i.e., a maximum in the current profile described below). As a power receptor 204 moves closer to one of the charging nodes 220A-D, the measured amperage value will increase. By comparing the measured amperage at a peak in the current profile to a predetermined lateral profile, the lateral distance of the power receptor 204, and thus the material handling vehicle 108, can be determined (e.g., by the vehicle controller 208 or another controller 500). The lateral profile may be determined, for example, by measuring amperage values at multiple lateral distances at the point of closest approach between the power receptor 204 and charging node 220. In some embodiments, the material handling vehicle 108 can be kept within a certain acceptable distance of the multi-function rack 212 by defining an acceptable range of amperage, for example measured at a peak in the measured current. In some embodiments, based on such measured amperage, control instructions (e.g., steering, motor) may be given to the material handling vehicle to maintain it in the acceptable range, to move it to an optimal distance, or the like. If such measured amperage is outside the acceptable range, then instructions can be given to the material handling vehicle 108 to steer or otherwise control it back into the acceptable range.

Alternatively, or additionally, if charging nodes 220A-D are present on both sides of an aisle, and power receptors 204A-D are present on both sides of the material handling vehicle 108, the relative distance between (i) a first side of the material handling vehicle 108 to a first side of the multi-function rack 212A and (ii) a second side of the material handling vehicle 108 to a second side of the multi-function rack 212B can be determined based on the relative strength of the maximum measured amperage on each side. If the total width of the aisle between the first and second sides of the multi-function rack 212 is known, then the absolute lateral distances on each side may be determined.

In some embodiments, the current may be measured with respect to time (i.e., a time-varying current) and then converted to distance or may be measured with respect to distance (i.e., a distance-varying current) and then converted to time. The conversion may be based on the speed of the material handling vehicle 108 and/or other relevant telemetry relating to the vehicle movement. The resulting measurement of the changing current as the material handling vehicle 108 moves along an aisle (with respect to distance or time) may be referred to as a "current profile." In some embodiments, the controller 208 (or another communicatively coupled controller 500) may determine a change in position per unit of time (for example, based on the curve or slope of the current profile), which the controller 208 can then use to calculate speed and acceleration of the material handling vehicle 108. In some embodiments, the current profile may be determined by electrical measurement of the charging node 220 instead of and/or in addition to the electrical measurement of the power receptor 204.

In some embodiments, the points of the current profile where the respective power receptor 204 is closest to the charging node 220 may result in a reduced ability to resolve position. More specifically, these locations, where the current profile is at a peak, allow a larger variation in position for a smaller change in the coupling current (i.e., the slope is shallow or zero). Similarly, the locations where the charging node 220 is receiving little or no coupling current also result in reduced spatial resolution (similarly having a shallow or no slope, or there being no signal to resolve). Thus, a current profile can also be configured to indicate the effectiveness of inductive coupling between a power receptor 204 and a charging node 220.

Figure 3B:
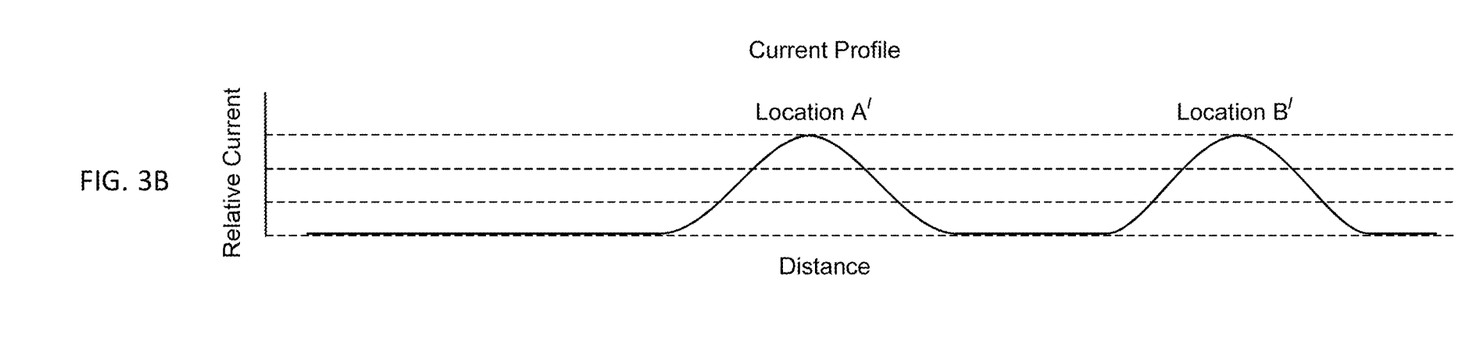
FIG. 3B graphically represents a second distance-varying current, in accordance with an embodiment.

Referring to FIGS. 3A and 3B, in some embodiments, multiple power receptors 204 may be interleaved (e.g., strategically offset from one another) to help resolve such areas of reduced spatial resolution. The spacing of such multiple power receptors 204 depends on many factors, such as number of power receptors 204 present on the material handling vehicle 108, the number and spacing of the charging nodes 220, the power transferred by the charging nodes 220, inductive coil size, whether charging nodes are present on one or multiple sides of the material handling vehicle 108, and the like. For example, FIG. 3B represents the current profile of a second power receptor (e.g., the second power receptor 204B) that is offset in position from the first power receptor 204A. When the current profile of the first power receptor 204A is zero (e.g., after it is out of range of charging node 220A), the second power receptor 204B can have a varying current profile as it moves by the first charging node 220A, the peak of which is labeled as "Location A'". Likewise, the current profile of the second power receptor 204B can have a maximum as it moves by the second charging node 220B, which is labeled as "Location B'". Therefore, the controller 208 may still resolve the location of the material handling vehicle 108.

In some embodiments, the multiple power receptors 204 may be offset at other than a 180 degree phase offset to increase the controller's 108 ability to resolve location. For example, if the second power receptor 204B is positioned on the material handling vehicle 108 such that its current profile is at a maximum (e.g., caused by the first charging node 220A) when the current profile of the first power receptor 204A is at a minimum (e.g., no longer in range of a charging node 220), then location resolution may remain reduced as the slopes of both current profiles are shallow or zero. If the multiple power receptors 204 are placed such that the current profile of the second power receptor 204B is not at a maximum or minimum when the current profile of the first power receptor 204A is at a maximum or minimum, then increased location resolution can be possible. Further, offsetting by other than 180 degrees can help resolve ambiguity in the direction of travel. By interleaving power receptors 204 as described above, a more continuous location resolution can be achieved.

In some embodiments, the material handling vehicle 108 may use odometry to determine a relative location of the material handling vehicle 108 within an operating environment (e.g., warehouse, aisle, or the like) based on information such as vehicle control, speed, tire diameter, heading direction, and/or other known factors. Such odometry may not be exact, and accuracy may be reduced by sensor inaccuracies, tire wear, gear wear, and so on. The vehicle location, as determined for example by odometry, may be interpolated (e.g., by the vehicle controller 208 or another communicatively coupled controller 500) with location as determined according to the current profile(s) (as described above) to determine a more accurate location. The material handling vehicle 108 may, for example via the controller 208, complement the odometry with the positional information determined by the distance-varying (or time-varying) current measurement. For example, the material handling vehicle 108 may know the predetermined location of all charging nodes 220, and the varying current measurement can be used (e.g., by the controller 208) to determine proximity to a charging node 220. The material handling vehicle 108 may, for example, determine a point of closest approach to a given charging node 220, which can be compared with and used to correct the location determined by the vehicle odometry.

In some implementations, devices or systems disclosed herein can be utilized or configured for operation using methods embodying aspects of the invention. Correspondingly, description herein of particular features, capabilities, or intended purposes of a device or system is generally intended to inherently include disclosure of a method of using such features for the intended purposes, a method implementing such capabilities, and a method of configuring disclosed (or otherwise known) components to support these purposes or capabilities. Similarly, unless otherwise indicated or limited, discussion herein of any method of manufacturing or using a particular device or system, including configuring the device or system for operation, is intended to inherently include disclosure, as embodiments of the invention, of the utilized features and implemented capabilities of such device or system.

Figure 4:
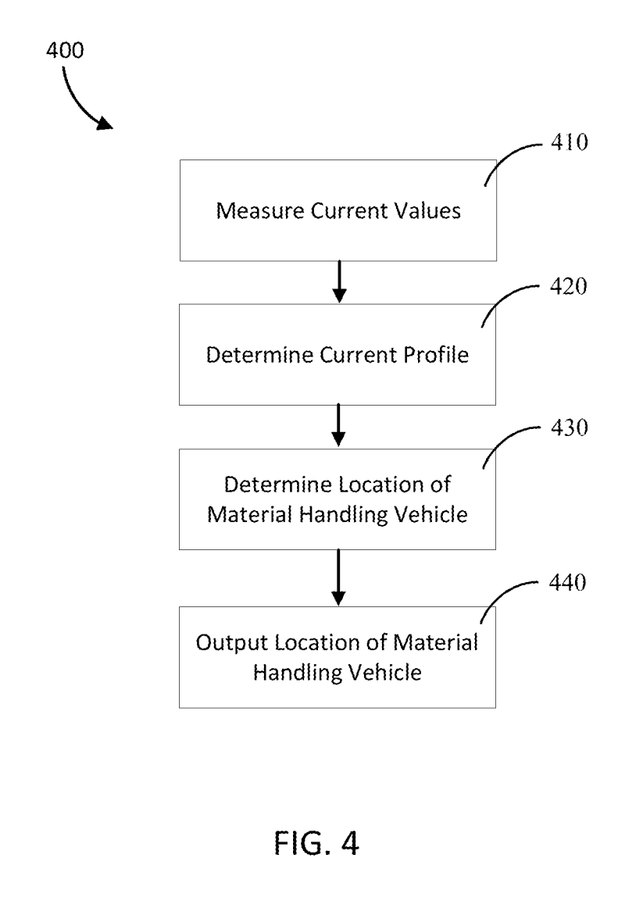
FIG. 4 illustrates a method for locating a material handling vehicle, in accordance with an embodiment.

Correspondingly, some embodiments of the present disclosure can include a method for determining a location of a material handling vehicle. Referring to FIG. 4, a non-limiting example of method for location determination 400 is illustrated. The location determination method 400 may be implemented, for example in the vehicle controller 208 or another coupled controller 500, as operating routines 530 stored in memory 520 (e.g., as software) and executable by a processor 510. The location determination method 400 may comprise measuring current values 410 from one or more power receptors 204, determining one or more current profiles 420 based on the measured current values, determining a location 430 of the material handling vehicle 108 based on the current profile(s), and outputting the location 440 of the material handling vehicle 108. In some embodiments, the location determination method 400 may be implemented on the warehouse management system 120.

At step 410, a current value from one or more power receptors 204 may be measured. A current value may be measured, for example, by a current sensor 206. Each current value can be an amperage sensed at a power receptor 204 at a given point in time. In some embodiments, at step 410, multiple current values can be measured at discrete timepoints, and for one or more power receptors (e.g., power receptors 204A-D). At step 420, one or more current profiles may be determined, for example by the controller 208 or the warehouse management system 120, based on the measured current values from step 410. In some embodiments, a current profile may be determined for each of a plurality of power receptors (e.g., power receptors 204A-D). In some embodiments, the current values may be normalized by automatic gain controls or other known methods, to allow unit dimensional analysis to be computed.

At step 430, a location of the material handling vehicle 108 may be determined based on the one or more current profile(s) In some embodiments, determining the location 430 may comprise determining a speed and direction of the material handling vehicle 108. In some embodiments, the location determination method 400 can determine the location of the material handling vehicle between two charging nodes 220 included in the multi-function rack 212. As described above, the amperage at a given power receptor 220 may increase as the power receptor is moved closer to a first charging node (e.g., charging node 220A), decrease as the power receptor is moved away from the first charging node, and increase again as the power receptor approaches a second charging node (e.g., charging node 220B). In some embodiments, the location determination method 400 can determine whether or not the current values for a previous set of time points have been decreasing, increasing, or staying about the same. For example, if the current values have been decreasing, the location determination method 400 can determine that the material handling vehicle 108 is moving away from the first charging node 220A; if the current values have been increasing, the location determination method 400 can determine that the material handling vehicle 108 is approaching the second charging node 220B; and if the current values have stayed about the same, the location determination method 400 can determine that the material handling vehicle 108 is located near the first charging node 220A.

In some embodiments, determining the location 430 of the material handling vehicle 108 may comprise determining a direction of travel and/or a speed of the material handling vehicle 108 based upon the plurality of current values (i.e., the current profile(s)). The speed can be determined by comparing how much the current values change between timepoints, with larger changes indicating higher speeds. The direction of travel can indicate if the material handling vehicle is moving parallel to the multi-function rack 212 or not. For example, in some embodiments, it can be determined that the truck is moving away from the multi-function rack if the current values sensed at all power receptors 204 on the same vehicle side are all decreasing. As further described above, with appropriate arrangement of power receptors 204, the direction of travel along the multi-function rack (e.g., forward or reverse down the aisle) may also be determined.

In some embodiments, where a single power receptor 204 is used (e.g., per vehicle side), the current profile of the single power receptor 204 can be used to estimate its position relative to a charging node 220. For example, the inverse function of the current profile can indicate relative distance to a charging node 220. With a single power receptor 204, the direction and absolute location of the material handling vehicle 108 may be resolved in combination with other inputs, such as vehicle speed, steer angle, and the like. For clarity, the current profile may provide the relative distance of the power receptor 204 to the charging node 220. This can then be translated to the relative distance and/or location of the material handling vehicle 108 since the location of the power receptor 204 on the material handling vehicle 108 will be predetermined. The location of a power receptor 204, and likewise a material handling vehicle 108, relative to a given charging node 220 may be referred to herein as the "local position" or "offset" from the given charging node 220.

In some embodiments, where multiple power receptors 204 are used (e.g., per vehicle side), the multiple current profiles can be used in a manner similar to analog or sinusoidal encoders. As the current profiles move through phases of high coupling (i.e., a maximum of the current profile) to low coupling (i.e., a minimum of the current profile), the position of the power receptors 204 (and thus the material handling vehicle 108) relative to a charging node (i.e., the offset) can be calculated. In some embodiments, direction (e.g., forward or backward along the multi-function rack 212) and speed can be resolved directly from the multiple current profiles and may not require additional inputs such as vehicle speed, steer angle, or the like.

In some embodiments, methods for analog encoders, such as sinusoidal encoders, may be used to determine location (e.g., local position), speed, and direction based on the multiple current profiles. For example, if two power receptors 204A, 204B are located on a first side of a material handling vehicle 108 such that their resulting current profiles are about or otherwise effectively 90 degrees out of phase when moving past a given charging node 220 along an intended path of travel for the material handling vehicle 108, then one of the current profiles ("A") can be treated as a sine signal and the other current profile ("B") can be treated as a cosine signal. The intended path of travel may include, for example the material handling vehicle 108 moving forward or reverse down an aisle, parallel to the direction of the multi-function rack 212. Signal processing may be performed on the signals to determine speed and direction, for example based on a quadrature encoding scheme. In some embodiments, the signals may be digitized (before or after signal processing). The phase of the signals may be determined by arctan (A/B), which can indicate the location with respect to the given charging node 220. The resolution of location may depend on the interpolation function used. For example, a standard 1024 interpolation function may determine 1024 discrete locations for every period of charging node 220 placement.

It will be recognized that the same methods may be used, for example, if the multiple power receptors 204A, 204C are located on opposite sides of the material handling vehicle 108 and a charging node 220 exists on each side of the aisle (e.g., charging node 220C on multi-function rack 212A, and charging node 220B on multi-function rack 212B). In some embodiments, the charging nodes 220B, 220C may be arranged at the same distance along the racks 212A, 212B (e.g., directly across the aisle from each other), and the power receptors 204A, 204C may be offset from each other (e.g., to create an effective 90 degree phase) such that they are not aligned across the material handling vehicle 108. In other embodiments, the power receptors 204A, 204C may be arranged at the same locations on each side of the material handling vehicle 108 (e.g., directly across the vehicle from each other), and the charging nodes 220B, 220C may be offset from each other (e.g., to create a 90 degree phase) such that they are not aligned across the aisle. In this way, the respective sine- and cosine-related signals may still be obtained by power receptors 204A, 204C on opposite sides of the material handling vehicle 108.

Typical radio location systems, such as UWB, and other location services used in warehouses, may have a typical resolution on the order of one meter due to technology limitations. In an exemplary embodiment according to the present description, having charging nodes 220 spaced at two meter intervals and using 1024 interpolation, location accuracy may be on the order of about two millimeters (2000 mm/1024). Advantageously, systems and methods according to the present description may have improved location resolution, while also providing power supplementation to a material handling vehicle.

The methods described above may determine the local position of the power receptors 204 and/or material handling vehicle 108 with respect to a charging node 220. Determining the location of the material handling vehicle 430 may further comprise determining the absolute position of the material handling vehicle within an operating environment (e.g., a warehouse). The absolute location of the material handling vehicle 108 may be determined by combining the determined local position with the absolute position of the respective charging node 220. In some embodiments, the absolute position of each charging node 220 may be predetermined and stored (e.g., in a memory 520) for use by the location determination method 400. In some embodiments, each charging node 220 may have a unique identifier. The unique identifier may be transmitted to the material handling vehicle 108, for example by the respective charging node 220 using a communication protocol. The material handling vehicle 108 may then look up the absolute position of the respective charging node 220 in memory and determine the absolute position of the material handling vehicle 108 by combining the looked up value with the determined local position.

In some embodiments, the warehouse management system 120 may know which charging node 220 is active, for example based on sensors 116, changes in electrical measurements of the charging node 220 (e.g., measured by an electrical sensor coupled to the charging node 220), communication received by the charging node 220 from the material handling vehicle 108 (e.g., from a power receptor 204 using a communication protocol), or the like. In some embodiments, the warehouse management system 120 may transmit the respective charging node identifier and/or absolute position of the respective charging node to the material handling vehicle 108, using any suitable communication method. The material handling vehicle 108 may then determine its absolute position as discussed above. In some embodiments, the material handling vehicle 108 may communicate its local position to the warehouse management system 120, using any suitable communication method. The warehouse management system 120 may then determine the absolute position of the material handling vehicle 108 as discussed above. Thus, the local position of the material handling vehicle 108 and the absolute position of the respective charging node 220 can be communicated to any suitable computation system (e.g., a controller 500) to determine the absolute position of the material handling vehicle 108.

At step 440, the location determination process 400 can output the determined location of the material handling vehicle. In some embodiments, at step 440, the location determination process 400 may output the determined speed, direction of travel, and/or lateral distance to racking. In some embodiments, this information may be output, e.g., by the material handling vehicle 108, to the warehouse management system 120 using any suitable communication methods. In some embodiments, this information may be output by the warehouse management system 120 to the material handling vehicle 108. In some embodiments, outputting 440 the determined location information may comprise storing it in memory, for example memory 520 of a controller 500.

In some embodiments, the warehouse management system 120 and/or the material handling vehicle 108 (e.g., via controller 208) can generate commands to pilot the material handling vehicle 108 based on the absolute location, speed, and/or direction of travel. For example, the warehouse management system 120 can generate a command to keep traveling along the multi-function rack 212 if the material handling vehicle has not passed enough charging nodes and/or a charging node with a particular identifier to make it to a prescribed destination. As another example, the warehouse management system 120 can generate a command to speed up or slow down the material handling vehicle based on the calculated speed. As yet another example, the warehouse management system 120 can generate a command to steer right or left to cause the material handling vehicle to move closer to the multi-function rack if the direction of travel indicates that material handling vehicle is moving parallel to the multi-function rack. For further example, the warehouse management system 120 can generate a command to stop the material handling vehicle 108 at the appropriate bay or rack so that an operator of the material handling vehicle 108 does not overshoot or undershoot the correct bay or rack, thus increasing efficiency.

Using aspects of the disclosure, a multi-function rack that efficiently locates and provides power to a material handling vehicle can be accomplished. The multi-function rack can allow material handling vehicles to operate continuously without stopping to recharge truck batteries, as well as replace some functionality of wire guidance systems. The multi-function rack can reduce or eliminate the need for remote charging systems and battery rooms. Additionally, when combined with newer battery technology such as lithium ion batteries (LIB), the multi-function rack could provide the ability to utilize a smaller amp-hour battery, thereby reducing initial capital outlay for a warehouse. Furthermore, smaller battery space requirements can allow for a reduced truck envelope, and thus potentially allow for more efficient warehouse design.

In addition, for certain types of vehicles there are training requirements imposed by various government agencies, laws, rules and regulations. For example, OSHA imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A location determination system for a material handling vehicle operating near a charging node, comprising:
   a power receptor configured to:
      receive electric power from the charging node; and
      provide a current to the material handling vehicle, wherein the current is based on the received electric power;
   a sensor electrically coupled to the power receptor and configured to measure the current provided by the power receptor; and
   a controller communicatively coupled to the sensor and configured to:
      determine a current profile based on the measured current; and determine a distance of the power receptor to the charging node based on the current profile.

2. The location determination system of claim 1, wherein the current profile comprises distance-varying current measurements.

3. The location determination system of claim 1, wherein the power receptor is a wireless power receptor.

4. The location determination system of claim 1, comprising a plurality of power receptors, and wherein the controller is configured to determine:
   a first current profile for a first power receptor of the plurality of power receptors; and
   a second current profile for a second power receptor of the plurality of power receptors.

5. The location determination system of claim 4, wherein the controller is further configured to determine, based on the first current profile and the second current profile, at least one selected from the group of a direction of the power receptor with respect to the charging node and a speed of the power receptor with respect to the charging node.

6. The location determination system of claim 5, wherein the first power receptor and the second power receptor are arranged on the material handling vehicle to cause the current profile of the first power receptor to be offset by a phase of about 90 degrees from the current profile of the second power receptor when the material handling vehicle moves by the charging node in an intended path of travel.

7. The location determination system of claim 1, wherein the power receptor is electrically coupled to at least one selected from the group of a battery of the material handling vehicle and a motor of the material handling vehicle.

8. The location determination of claim 1, wherein the controller is further configured to:
   determine a distance of the material handling vehicle from the charging node based on the determined distance of the power receptor from the charging node; and
   determine a location of the material handling vehicle based a predetermined location of the charging node and the determined distance of the material handling vehicle from the charging node.

9. A power delivery system for receiving power from a charging node, comprising:
   a material handling vehicle, comprising:
      a power receptor coupled to the material handling vehicle and configured to:
         receive electric power wirelessly from the charging node; and
         provide a current to the material handling vehicle, wherein the current is based on the received electric power;
      a sensor electrically coupled to the power receptor and configured to measure the current provided by the power receptor; and
      a controller electrically coupled to the sensor and configured to:
         determine a current profile based on the measured current, wherein the current profile comprises distance-varying current measurements; and
         determine a location of the material handling vehicle based on the current profile.

10. The power delivery system of claim 9, wherein:
   the material handling vehicle comprises a plurality of power receptors; and
   the controller is configured to determine:
      a first current profile for a first power receptor of the plurality of power receptors; and
      a second current profile for a second power receptor of the plurality of power receptors.

11. The power delivery system of claim 10, wherein the controller is further configured to determine, based on the first current profile and the second current profile, at least one selected from the group of a direction of the material handling vehicle with respect to the charging node and a speed of the material handling vehicle with respect to the charging node.

12. The power delivery system of claim 11, wherein the first power receptor and the second power receptor are arranged on the material handling vehicle to cause the current profile of the first power receptor to be offset by a phase of about 90 degrees from the current profile of the second power receptor when the material handling vehicle moves by the charging node in an intended path of travel.

13. The power delivery system of claim 9, wherein the power receptor is electrically coupled to at least one selected from the group of a battery of the material handling vehicle and a motor of the material handling vehicle.

14. The power delivery system of claim 9, wherein determining the location of the material handling vehicle comprises:
   determining a distance of the power receptor to the charging node; and
   receiving a predetermined location of the charging node from a memory communicatively coupled to the controller.

15. A method for determining a location of a material handling vehicle, comprising:
   receiving, via a wireless power receptor, electric power from a charging node;
   providing, via the wireless power receptor, a current to the material handling vehicle based on the received electric power;
   measuring the current provided by the wireless power receptor at a plurality of times;
   determining a current profile based on the plurality of measured currents; and
   determining a distance of the power receptor to the charging node based on the current profile.

16. The method of claim 15, wherein the material handling vehicle comprises a plurality of power receptors, and wherein determining the current profile comprises:
   determining a first current profile for a first power receptor of the plurality of power receptors; and
   determining a second current profile for a second power receptor of the plurality of power receptors.

17. The method of claim 16, further comprising:
   determining, based on the first current profile and the second current profile, at least one selected from the group of a direction of the power receptor with respect to the charging node and a speed of the power receptor with respect to the charging node.

18. The method of claim 15, wherein providing power to the material handling vehicle comprises providing power to at least one selected from the group of a battery of the material handling vehicle and a motor of the material handling vehicle.

19. The method of claim 15, further comprising:
   determining a distance of the material handling vehicle from the charging node based on the determined distance of the power receptor from the charging node; and
   determining a location of the material handling vehicle based a predetermined location of the charging node and the determined distance of the material handling vehicle from the charging node.

20. The method of claim 19, wherein determining a distance of the material handling from the charging node comprises determining at least one selected from the group of a speed of the material handling vehicle and a steering angle of the material handling vehicle.

\* \* \* \* \*